(12) United States Patent
Manning

(10) Patent No.: US 7,190,741 B1
(45) Date of Patent: Mar. 13, 2007

(54) REAL-TIME SIGNAL-TO-NOISE RATIO (SNR) ESTIMATION FOR BPSK AND QPSK MODULATION USING THE ACTIVE COMMUNICATIONS CHANNEL

(75) Inventor: Robert M. Manning, Strongsville, OH (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 752 days.

(21) Appl. No.: 10/274,756

(22) Filed: Oct. 21, 2002

(51) Int. Cl.
  *H04L 27/00* (2006.01)
  *H04Q 1/20* (2006.01)
  *H04B 1/10* (2006.01)
(52) U.S. Cl. .................... 375/324; 375/227; 375/254; 375/285
(58) Field of Classification Search .................... None
  See application file for complete search history.

(56) References Cited

U.S. PATENT DOCUMENTS

| | | | |
|---|---|---|---|
| 5,303,269 A * | 4/1994 | Altes | 375/322 |
| 5,317,599 A | 5/1994 | Obata | |
| 5,337,251 A | 8/1994 | Pastor | |
| 5,351,274 A * | 9/1994 | Chennakeshu et al. | 375/347 |
| 5,566,214 A | 10/1996 | Kroeger et al. | |
| 5,721,694 A | 2/1998 | Graupe | |
| 5,764,707 A | 6/1998 | Gurusami et al. | |
| 5,768,323 A | 6/1998 | Kroeger et al. | |
| 5,872,810 A | 2/1999 | Philips et al. | |
| 5,898,699 A | 4/1999 | Chiba | |
| 5,960,040 A * | 9/1999 | Cai et al. | 375/279 |
| 6,061,339 A | 5/2000 | Nieczyporowicz et al. | |
| 6,128,494 A | 10/2000 | Rozmaryn | |
| 6,137,824 A | 10/2000 | Liu | |
| 6,201,954 B1 | 3/2001 | Soliman | |

(Continued)

OTHER PUBLICATIONS

Opperdoes, Fred, "Maximum Likelihood", Aug. 8, 1997, www.icp.ucl.ac.be/~opperd/private/max_likeli.html.*

*Primary Examiner*—Kevin Kim
*Assistant Examiner*—Linda Wong
(74) *Attorney, Agent, or Firm*—Howard M. Cohn; Kent N. Stone

(57) ABSTRACT

Method and apparatus for estimating signal-to-noise ratio (SNR) $\gamma$ of a composite input signal $e(t)$ on a phase-modulated (e.g., BPSK) communications link. A first demodulator receives the composite input signal and a stable carrier signal and outputs an in-phase output signal; a second demodulator receives the composite input signal and a phase-shifted version of the carrier signal and outputs a quadrature-phase output signal; and phase error $\theta_E(t)$ contained within the composite input signal $e(t)$ is calculated from the outputs of the first and second demodulators. A time series of statistically independent phase error measurements $\theta_E(t_1)$, $\theta_E(t_2)$, . . . , $\theta_E(t_k)$ is obtained from the composite input signal subtending a time interval $\Delta t = t_k - t_1$ whose value is small enough such that $\gamma(t)$ and $\sigma(t)$ can be taken to be constant in $\Delta t$. A biased estimate $\gamma^*$ for the signal-to-noise ratio (SNR) $\gamma$ of the composite input signal is calculated using maximum likelihood (ML) estimation techniques, and an unbiased estimate $\hat{\gamma}$ for the signal-to-noise ratio (SNR) $\gamma$ of the composite input signal is determined from the biased estimate $\gamma^*$, such as by use of a look-up table.

12 Claims, 3 Drawing Sheets

U.S. PATENT DOCUMENTS 6,233,439 B1   5/2001   Jalali
6,317,456 B1   11/2001  Sayeed
6,359,878 B1   3/2002   Lakkis et al.
6,414,985 B1   7/2002   Furukawa et al.
6,421,399 B1   7/2002   Avidor et al.
6,426,971 B1   7/2002   Wu et al.
6,611,794 B1 * 8/2003   Fleming-Dahl ............. 702/191

* cited by examiner

REAL-TIME SIGNAL-TO-NOISE RATIO (SNR) ESTIMATION FOR BPSK AND QPSK MODULATION USING THE ACTIVE COMMUNICATIONS CHANNEL

ORIGIN OF THE INVENTION

The invention described herein was made by an employee of the United States Government and may be manufactured and used by or for the Government for Government purposes without the payment of any royalties thereon or therefore.

TECHNICAL FIELD OF THE INVENTION

This invention relates generally to communications systems and, more particularly, to methods for estimating a signal-to-noise ratio (SNR) of digital signals, such as phase-shift keyed (PSK) signals such as binary phase-shift keyed (BPSK) and quadrature phase-shift keyed (QPSK) signals, without a separate pilot signal being used.

BACKGROUND OF THE INVENTION

The transfer of binary data by carrier phase shifts, commonly known as binary phase shift keying (BPSK), is a well-known technique and an alternative to amplitude modulation or frequency modulation data transfer techniques. It is however common for these various techniques to be combined, for example, a sub-carrier modulated by phase-shift keying used as a signal for the amplitude modulation or the frequency modulation of a main carrier.

Phase shift keying ("PSK") modulation is frequently used to transmit digital data. PSK involves shifting the phase of the carrier according to the value of the digital data. For example, in binary PSK ("BPSK") the "zeros" in the digital data may be represented by a 180 degree shift in the phase of the carrier, while the "ones" in the digital data may be represented by no phase shift. Other degrees of phase shifting may be used. Quadrature PSK ("QPSK") involves phase shifts of 0, 90, 180 and 270 degrees. PSK typically is referred to as "MPSK" where the "M" represents the number of phases. (The term "M-ary" is also commonly used.)

After a transmitter sends an MPSK signal over the selected transmission medium (e.g., telephone lines or radio frequency waves), a receiver detects the phase changes in the signal. In order to do this accurately, the receiver must extract the unmodulated frequency and phase (commonly referred to as the reference frequency and phase) of the carrier from the received signal. Traditionally, phase-locked loop ("PLL") circuits have been used to acquire carrier phase. PLLs are relatively easy to implement with either analog or digital technology and, in general, are considered to have good "steady state" performance. Receivers incorporating digital signal processors (DSPs) are well known.

The assessment of the propagation conditions that prevail on a communications link, whether it is a point-to-point terrestrial link or an earth-space link, is of vital importance for the optimal operation of the communications link. The significant indicator of the communications quality of the link is the signal-to-noise ratio (SNR) $\gamma$. If the value of this quantity goes below a certain given threshold due, for example, to atmospheric conditions such as rain, the bit error rate on the link becomes unacceptable for reliable communications integrity. Instantaneous (or real-time) knowledge of the dynamic behavior of the SNR $\gamma$ is thus essential for the optimal implementation of procedures to mitigate the further degradation of $\gamma$. In many instances, a separate propagation receiver (or pilot signal) is employed to acquire an associated signal transmitted by a beacon on a communications satellite. Measurement of the fading conditions of this signal level is then extrapolated to that of the operational communications link.

Many methods have been advanced to estimate the SNR using an active modulated communications channels. For example, the output of the receiver matched filter can be sampled, i.e., the voltage level $V_S$ for an output symbol, and the value is compared to a pair of a priori determined voltage levels $\pm\alpha, \alpha > 0$ $\alpha < \sqrt{V_S}$. The statistical frequency of occurrence $n_F$ of values which fail to fall within the interval $[-\alpha, \alpha]$ is calculated as well as the total number $n_T$ of samples considered. The ratio $n_F/n_T$ is related to the symbol error probability by $$\frac{n_F}{n_T} = 2Q\left(\sqrt{k\frac{2E_S}{N_0}}\right), k \equiv \left[1 - \frac{\alpha}{\sqrt{V_S}}\right]$$

where $E_S$ is the symbol energy (i.e., energy per symbol), $N_0$ twice the noise power at the output of the matched filter and $Q(\ldots)$ is the well-known Q-function. This relationship is then solved for the SNR $\gamma = E_S/N_0$ by using the inverse function $Q^{-1}(\ldots)$. Although this method has several shortcomings, e.g., limited dynamic range and sensitivity to automatic gain control variations and inter-symbol interference, it suffers from an irreconcilable defect; the inversion of the function $Q(\ldots)$, necessary to obtain the estimate $\hat{\gamma}$ of $\gamma$, is mathematically correct only if $dQ/d\gamma \neq 0$. In the event that $dQ/d\gamma \to 0$, the problem of determining $\hat{\gamma}$ becomes ill-posed. That is, a small error in the estimate of $n_F/n_T$ leads to a large error in the estimate $\hat{\gamma}$. In fact, the ill-posedness of this problem is the major source of the lack of dynamic range.

As is well-known, for a problem to be well-posed, in the sense of Hadamard, it must meet the following criteria: (1) for each set of data, there exists a solution; (2) the solution is unique; and (3) the solution is stable, i.e., depends continuously on the problem data. If a problem does not meet one or more of these criteria, the problem is considered to be ill-posed. (See, e.g., A. N. Tikhonov and V. Y. Arsenin, *Solutions of Ill-Posed Problems* (John Wiley & Sons, New York, 1977).)

An entirely different approach can be imagined which avoids the ill-posedness of the technique described above, and thus tends to be more robust in the presence of measurement errors inherent in the sampling of the matched filter output. In the bi- (or binary) phase-shift keying (BPSK) case, the sampled voltage $V_S$ is related to the bi-phase signal amplitude $\pm A$ and the corresponding in-phase noise component $N_c$ by $$V_S = K(\pm A + N_c)$$

where K is a constant proportionality coefficient incorporating receiver gain factors, etc. Remembering that the goal here is to obtain an expression for the SNR $\gamma = E_S/N_0 = A^2/2\sigma_N^2$ where $\sigma_N^2 = \langle N_c^2 \rangle$ for zero mean, white Gaussian noise, the method endeavors to obtain this ratio solely from the measured values of $V_S$. Thus, to separate the noise term, one would try to form the average $\langle V_S \rangle$ using the fact that $\langle N_c \rangle = 0$. However, the random bipolar nature of the signal amplitude A also yields a zero average, giving $\langle V_S \rangle = 0$. The technique that is then adopted in this approach is to form the absolute value $|V_S|$ of each sample and then forming the ensemble average giving $$\langle |V_S| \rangle = \langle |K(\pm A + N_c)| \rangle \approx KA$$

so long as the condition $A \gg \sigma_N$ prevails. Additionally, the sampled values $V_S$ are used to compute the variance $$\langle V_S^2 \rangle = K^2(A^2 + \sigma_N^2)$$

Hence, using the former expression to rid to the $A^2$ term to give $$\sigma_N^2 = \langle V_S^2 \rangle - \langle |V_S| \rangle^2$$

therefore allowing one to write $$\gamma = \frac{A^2}{2\sigma_N^2} = \frac{\langle |V_S| \rangle^2}{2(\langle V_S^2 \rangle - \langle |V_S| \rangle^2)}$$

solely in terms of the voltage samples $V_S$.

A major drawback of the technique described above is the formation and use of the absolute value of the random quantity $V_S$; such an operation can drastically change the statistical characteristics of the random variable.

Even though using the absolute value of the random quantity $V_S$ was done to get rid of the bipolar nature of the communications signal amplitude, as will become evident from an understanding of the techniques of the present invention, as presented hereinbelow, using the absolute value of the random quantity $V_S$ will be shown to be mathematically faulty and, moreover, needless. As taught by the present invention (described hereinbelow), one can, and in fact should, incorporate the bipolar nature of the signal amplitude into a rigorous statistical analysis; this characteristic of the signal being just as important as its other aspects. In addition, the aforementioned absolute value approach requires the use of a predetermined bit-stream format within the communications data composed of a series of 1's, thus necessitating a synchronization with, for example, a preamble within the modulation format. This results in a further complication of its implementation and will be shown to be unnecessary.

It is an underlying purpose of the present invention to formulate the rigorous statistical basis for the correct estimation of BPSK signal SNR from what is known about its behavior at the input and output of the receiver demodulator. Instead of employing tacit and unwarranted assumptions concerning the nature of the communication signal for analytical simplification, a complete consistent statistical description of a BPSK signal will be provided to which the well-known techniques of maximum likelihood estimation theory can be applied. By employing, rather than neglecting, all the subtitles of the statistics describing the BPSK signal, an unbiased estimation procedure will be derived that makes simple use of its inherent phase characteristics at the demodulator. In the following description, a preliminary review of BPSK signal representation will be given which will lay the foundation for the statistical connection between Gaussian noise and SNR. Once an appropriate probabilistic description is obtained that establishes a rigorous contact between SNR and the measured phase error of the BPSK signal entering the receiver demodulator, the methods of maximum likelihood estimation theory will be used to obtain analytical expressions for biased and unbiased estimates of SNR from easily measured phase errors. Finally, the straightforward modifications needed at the demodulator to implement the required phase measurements will be given. It should be noted that the resulting SNR estimation technique is also applicable for a quarterary phase-shift keying (QPSK) demodulator simply by applying it to one of the BPSK arms with appropriate modifications for the SNR expression.

PRIOR ART PATENTS

Before proceeding to a description of the present invention, the following U.S. Patents are cited as useful examples of prior art relating to receivers, modulation schemes, demodulators and/or SNR estimation, and are incorporated in their entirety by reference herein. In some cases, comments elaborating on the shortcomings of the prior art and/or contrasting the prior art with features of the present invention are made.

U.S. Pat. No. 5,317,599 discloses a method and circuit for detecting the carrier-to-noise (CN) ratio of a quarterary phase-shift keying (QPSK) signal. A binary signal including in the QPSK signal is reproduced by a converting circuit including a QPSK demodulator (FIG. 2; element 4) and a difference converter. (The QPSK demodulator 4 synchronous-demodulates the voice subcarrier to provide coherent component signal I and orthogonal component signal Q.) The binary signal is then error-controlled by an error detecting circuit and the detection of a double-error. The occurrence number of the double-error is counted during a predetermined time period which is long enough to compare with the occurrence time when two successive double-errors occur. A microcomputer stores a conversion table corresponding to the theoretical relation between the CN ratio and the occurrence number. The microcomputer computes the CN ratio from the detected occurrence number. The theoretical relation is formulated based on the assumption that noise distributes isotopically around the QPSK signal in the signal space in accordance with the normal distribution. Although the method of this patent is related to the present invention, it is limited to a particular modulation method (i.e., is not generic) and the estimation procedure is ill-posed (not well-posed).

U.S. Pat. No. 5,337,251 discloses a method of detecting a useful signal affected by noise. A measurement is taken of the expected S/N ratio (SNR) of this signal over a time slice, a measurement of the estimated white noise alone is taken over another time slice without the useful signal, the mean energy of the noise and of the noise-affected signal is calculated, in each of their time slices, the theoretical detection threshold is calculated, the ratio of these two energies is calculated, and the ratio is compared with the calculated threshold, this threshold being greater than 1 (ideal threshold). This patent describes detection of a signal within a noisy environment, and an estimation procedure is employed to accomplish this, but the solution is not well-posed.

U.S. Pat. No. 5,721,694 discloses a method and system for filtering a noisy input comprised of an information signal and a noise signal. No prior time domain value information or frequency domain parameter information on the information signal or noise signal is available. A whitening filter renders the noise part of a noise signal into a substantially white noise signal. A Fourier transform system provides an amplitude spectrum output and a phase output. A multiplier squares the amplitude spectrum output thus providing a power spectrum output. A zero mean sub-system generates a zero mean power spectrum output from the power spectrum output. A square root sub-system squares the zero mean power spectrum output thus providing a resultant output. An inverse Fourier transform sub-system inversely transforms the resultant output to provide a time domain resultant output. An inverse whitening filter provides a substantially noise free output from the time domain resultant output. Although this method uses sampling and statistical methods to attempt to provide a noise-free signal for communications, it requires a specific receiver structure and does not address SNR estimation for the general case.

U.S. Pat. No. 5,764,707 discloses a method for signal demodulation, based upon the assessment of an error statistic which is independent of the content of the data stream. To determine the appropriate sampling point within a data period, multiple sampling points are utilized to generate a set of alternative decodings of the data stream. Associated with each of these alternative sets is an error statistic which is computed based upon a known characteristic of the transmitted stream. For example, in Differential QPSK, the encoded phase change is known to be a multiple of 90 degrees. The error statistic would be a function of the difference between each sampled phase and the nearest multiple of 90 degrees. This error statistic provides a quantifiable measure of quality and noise margin associated with each sampling point. The decoded stream associated with the error statistic of highest quality is then selected as the proper decoding of the transmitted data stream. This invention is particularly well suited for processing small data packets, such as ATM. Although this method uses an indirect measure of SNR, it is used for direct signal reception and, therefore is part of a specific receiver structure.

U.S. Pat. No. 6,061,339 discloses a fixed wireless loop system having adaptive system capacity based on estimated signal-to-noise ratio. The disclosed method is for operating a fixed wireless system (FWS) having a radio base unit (RBU) that uses a code division multiple access (CDMA) airlink for communicating with a plurality of subscriber units (SUs). The method includes steps of (a) estimating a signal-to-noise ratio (SNR) of the FWS; (b) comparing the estimated SNR to a threshold SNR value; and (c) one of allowing service to another SU or not allowing service to another SU based on the result of the step of comparing. The step of estimating preferably uses a normalized SNR, and further employs the use of a null PN code detection technique. Although this method uses an estimated SNR to accomplish the adaptive operation of a digital communications system, the estimation is not well-posed.

U.S. Pat. No. 6,201,954 discloses a method and system for providing an estimate of the signal strength of a received signal. The signal strength of a received signal in a communication system is estimated by the measured signal strength of a desired signal which is transmitted from a source device to a destination device. The energy of the desired signal and the energy of the noise are measured or computed. The measured signal strength can be computed by dividing the energy of the desired signal with the energy of the noise. The signal strength of the desired signal can be estimated as the maximum likelihood estimate of the actual signal strength. The signal strength of the desired signal can also be estimated based on the expected value of the energy of the desired signal. The signal strength of the desired signal can further be estimated based on the expected value of the energy of the desired signal and accounting for a predetermined bias. Although this method addresses the SNR estimation, the statistical procedure used is not generically applicable.

U.S. Pat. No. 6,233,439 discloses signal-to-noise estimation of forward link traffic channel for fast power control. The process of estimating Eb/No (bit-energy-to-noise-density) of the received signal generates two streams of power control bits that are transmitted to the base station. One of the power control bit streams is generated under the assumption that the frame rate has not changed. The other power control bit stream is generated under the assumption that the frame rate has changed. The base station, knowing whether or not the frame rate changed, chooses the appropriate stream to use in controlling the base station transmit power. Although this method addresses SNR estimation, it is limited in terms of its applicability.

U.S. Pat. No. 6,317,456 discloses methods of estimating the signal-to-noise ratio (SNR) of a signal in an orthogonal frequency division multiplexed (OFDM) system include the steps of representing the signal as a complex symbol and rotating the complex symbol in a complex plane so that the signal component of the function lies substantially on the real axis of the complex plane and the noise function lies substantially on the imaginary axis of the complex plane. By obtaining the means squared value of the complex symbol and the variance of the complex symbol and dividing them, an estimate for the SNR of the signal is obtained. FIG. 2 of this patent is a block diagram of a receiver in an OFDM system for demodulating a signal having a noise component so that the SNR of the signal can be estimated. Although this method is very relevant in that it addresses the SNR estimation problem, it uses a mean-square estimation procedure which is exemplary of an ill-posed problem, and the method also requires post-processing.

U.S. Pat. No. 6,137,824 discloses a method for estimating signal and noise quality, and a receiver. The highest value of a correlation vector is compared either to the second highest value or to the mean value of the other values. If a specific spreading code is used in the reception of the signal, the comparison forms a ratio of the signal and disturbance, the ratio being applicable particularly to combining signals from the diversity branches of a diversity receiver, whereby the method makes it possible to combine the signals even prior to detection. If the reception employs a spreading code with which no signal received by the receiver has been transmitted, it is possible by comparing the correlation values to form a noise quality estimate, an estimate value higher of which meaning that the receiver is receiving a signal and not just noise. Although this method addresses the SNR estimation problem, it requires a specifically prepared receiver structure and is therefore not generic. The estimation procedure is not well-posed, and the method also requires pre-processing.

U.S. Pat. No. 6,128,494 discloses signal-to-noise and interface estimator for analog voice channel. The residual phase deviation of the supervisory audio tone (SAT) and/or signaling tone (ST) signal in an analog voice channel cellular communication system is used to estimate the underlying signal-to-noise ratio (SNR) and signal-to-interference ratio (SIR). The phase deviation is estimated using a two-stage autoregressive filter/variance estimator, which may be implemented in firmware in a digital signal processor. This method estimates SNR on an analog, rather than digital communications link. The estimation procedure is not well-posed, and requires pre-processing.

SUMMARY OF THE INVENTION

It is a general object of the invention to provide an improved technique for estimating the real-time signal-to-noise ratio (SNR) estimate γ of a communications link.

It is a further object to ease the operational and financial burden to terminal operation, by estimating γ of the communications link by measuring various quantities of the operational communications link itself, without necessitating the use of a separate propagation link which is independent of the communications link.

According to the invention, method and apparatus are provided for estimating signal-to-noise ratio (SNR) γ of a composite input signal e(t) on a phase-modulated (e.g., BPSK) communications link comprises providing a first demodulator receiving the composite input signal and a stable carrier signal, and outputting an in-phase output signal; providing a second demodulator receiving the composite input signal and a phase-shifted version of the carrier signal, and outputting a quadrature-phase output signal; and phase error $\theta_E(t)$ contained within the composite input signal e(t) is calculated from the outputs of the first and second demodulators.

Further according to the invention, a time series of statistically independent phase error measurements $\theta_E(t_1)$, $\theta_E(t_2)$, ..., $\theta_E(t_k)$ is obtained from the composite input signal subtending a time interval $\Delta t = t_k - t_1$ whose value is small enough such that γ(t) and σ(t) can be taken to be constant in Δt.

Further according to the invention, a biased estimate γ* for the signal-to-noise ratio (SNR) γ of the composite input signal is calculated using maximum likelihood (ML) estimation techniques, and an unbiased estimate $\hat{\gamma}$ for the signal-to-noise ratio (SNR) γ of the composite input signal is determined from the biased estimate γ*, such as by use of a look-up table.

The present innovation provides a proper mathematical basis for such SNR estimation. The basic significance of the procedures disclosed herein make them applicable for a wide range of situations involving the digital transmission of data, including:

terrestrial and space communication;

cellular and hand-held telephones;

planetary communications; and optical (including fiber) communications.

The estimation techniques of the present invention are very useful in that they use, as basic inputs, the very entity that is desired to be assessed—i.e., the digital data stream which conveys the communication of information. The use of actual communications link in the assessment of the prevailing SNR makes for not only a more direct and simpler measurement of the propagation conditions, but also includes the potential degradations that may be introduced by the communications equipment itself—such effects cannot be captured by using a separate propagation link which is independent of the communications link.

The inclusion of all the complications of the statistical nature of the communications data stream results in a simple and straightforward 'recipe' to deconvolve the SNR characteristics; the simplicity inherent in the approach is the result of fully utilizing the unimpaired mathematical nature which lies at the basis of digital communications.

The invention therefore provides real-time, in situ signal-to-noise ratio estimation for the assessment of operational communications links, using the active communications channel (link).

Advantages of the SNR estimation technique of the present invention include that:

the technique is passive in that it does not require any specifically prepared communications systems, signals or structures, is not limited to a particular modulation method, does not require a specific receiver structure, and does not require either pre- or post-processing;

the technique is generic in that is applicable to any digital communications system that used phase shift modulation; and the technique is well-posed in that the mathematical procedure used is correct in terms of the 'stability' of its statistical solution, which means that the solution is impervious to the ever-present small variations in measured input data.

Other objects, features and advantages will become apparent in light of the following description thereof.

DETAILED DESCRIPTION OF THE INVENTION

The present invention employs a rigorous statistical basis for the correct estimation of communication link SNR of a BPSK, QPSK (and M-ary) phase-modulated digital signal from what is known about its statistical behavior at the output of the receiver demodulator. Many methods to accomplish this have been proposed and implemented in the past, but all of them are based on tacit and unwarranted assumptions, and are thus defective. However, the basic idea is well-founded—i.e., the signal at the output of a communications demodulator has convolved within it the prevailing SNR characteristic of the link. The acquisition of the SNR characteristic is of the utmost importance to a communications system that must remain reliable in adverse propagation conditions. The present invention provides a correct and consistent mathematical basis for the proper statistical 'deconvolution' of the output of a demodulator to yield a measure of the SNR. The mathematical analysis is based on the well-known statistical analysis of signal and noise flow through a generic M-ary demodulator and the techniques of maximum likelihood estimation theory. By employing, rather than neglecting all the subtitles of the statistics describing the stochastic phase-modulated signal, unbiased estimation procedures will be derived that makes simply use of the inherent signal phase characteristics at the demodulator output. The use of such techniques will alleviate the need and expense for a separate propagation link to assess the propagation conditions prevailing on the communications link. Furthermore, these techniques are applicable for every situation involving the digital transmission of data over planetary and space communications links.

In the description that follows, a number of equations are set forth, and are generally identified, for purposes of cross-referencing, with the standard notation (Eq.x).

Preliminaries of Signal Representation

Figure 1:
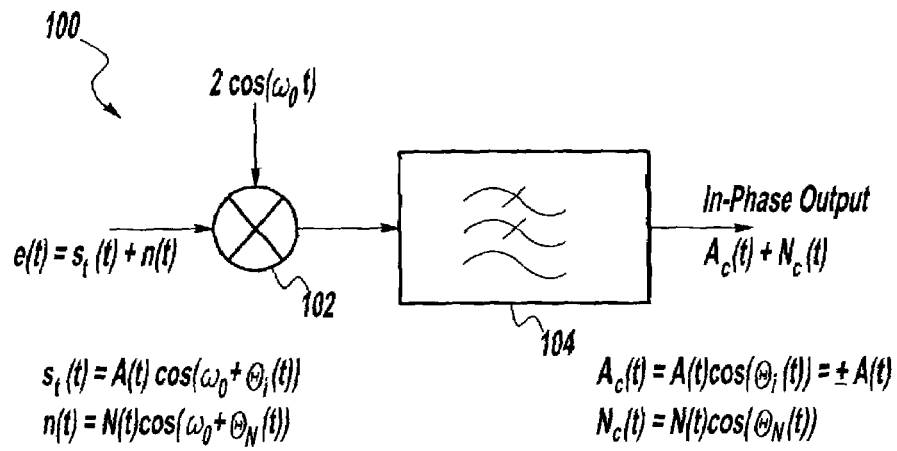
FIG. 1 is a simplified block diagram of a typical BPSK demodulator of the prior art, showing the relationship between signal parameters (between inputs and outputs)

FIG. 1 illustrates a typical, simple BPSK demodulator 100 of the prior art, showing the relationship between signal parameters at its input and output.

A mixer (e.g., multiplier) 102 has two inputs: an input receiving (e.g., from a receiver block, not shown) a composite signal e(t) having signal $s_i(t)$ and noise n(t) components, and an input receiving (e.g., from a phase-lock loop, not shown) a stable carrier signal $2\cos(\omega_0 t)$. The output of the mixer 102 contains sum and difference components of the composite input signal and the carrier signal. To reject (suppress, eliminate) the sum component, and preserve the difference component, the output of the mixer 102 is passed through a low pass (bandpass) filter 104, the output of which is the in-phase output $A_c(t)+N_c(t)$ of the demodulator 100.

The phase-modulated signal $s_i(t)$ at the input of the demodulator is defined by $$s_i(t) = A(t)\cos(\omega_0 t + \theta_i(t)), \quad \theta_i(t) \equiv \frac{2\pi(i-1)}{M}, \, i = 1, 2; \, M = 2 \quad \text{(Eq.1)}$$

where $\omega_0$ is the angular frequency of the carrier wave, A(t) is its time varying amplitude and $\theta_i(t)$ is its bi-phase state. In terms of quadratures, the noise-free BPSK signal is given by $$s_i(t) = A(t)[\cos(\omega_0 t)\cos(\theta_i(t)) - \sin(\omega_0 t)\sin(\theta_i(t))] = \quad \text{(Eq.2)}$$
$$A(t)\cos(\omega_0 t)\cos(\theta_i(t)) = A_c(t)\cos(\omega_0 t),$$
$$A_c(t) \equiv A(t)\cos(\theta_i(t))$$

where $$A_c(t) \equiv A(t)\cos(\theta_i(t)) = \pm A(t) \quad \text{(Eq.3)}$$

This demonstrates that the noise free signal only has an in-phase component $A_c(t)$ since the bi-phase states are $\theta_1(t)=0°$, $\theta_2(t)=180°$ thus relegating the sine factors to zero.

Similarly, the noise n(t) associated with the input is given by $$n(t) = N(t)\cos(\omega_0 t + \theta_N(t)) \quad \text{(Eq.4)}$$

where N(t) is the time varying amplitude of the noise and $\theta_N(t)$ is the associated phase.

In terms of quadratures, the noise is given by $$n(t) = N(t)[\cos(\omega_0 t)\cos(\theta_N(t)) - \sin(\omega_0 t)\sin(\theta_N(t))] = \quad \text{(Eq.5)}$$
$$N_c(t)\cos(\omega_0 t) - N_s(t)\sin(\omega_0 t)$$

where $$N_c(t) \equiv N(t)\cos(\theta_N(t)) \quad \text{(Eq.6)}$$

and $$N_s(t) \equiv N(t)\sin(\theta_N(t)) \quad \text{(Eq.7)}$$

showing that, unlike the noise-free BPSK signal component, the noise is characterized by both in-phase and quadrature terms. The composite signal e(t) at the input of the demodulator is given by $$e(t) = s_i(t) + n(t) = [A_c(t) + N_c(t)]\cos(\omega_0 t) + N_s(t)\sin(\omega_0 t) \quad \text{(Eq.8)}$$

where use has been made of equations (Eq.2) and (Eq.5). Writing the composite signal e(t) in terms of its in-phase and quadrature components and employing equation (Eq.8) yields $$e(t) \equiv E_c(t)\cos(\omega_0 t) - E_s\sin(\omega_0 t) \quad \text{(Eq.9)}$$

where $$E_c(t) \equiv A_c(t) + N_c(t) \quad \text{(Eq.10)}$$

and $$E_s(t) \equiv N_s(t) \quad \text{(Eq.11)}$$

Writing equation (Eq.9) in the standard form in which the signal and noise components are written in equations (Eq.1) and (Eq.4), finally gives $$e(t) = E\cos(\omega_0 t + \theta_E(t)) \quad \text{(Eq.12)}$$

where $$E(t) = \sqrt{E_c^2(t) + E_s^2(t)}, \quad \theta_E(t) = \tan^{-1}\left[\frac{E_s}{E_c}\right] \quad \text{(Eq.13)}$$

Thus, $$E_c(t) = E(t)\cos(\theta_E(t)) \quad \text{(Eq.14)}$$

and $$E_s(t) = E(t)\sin(\theta_E(t)) \quad \text{(Eq.15)}$$

Figure 2:
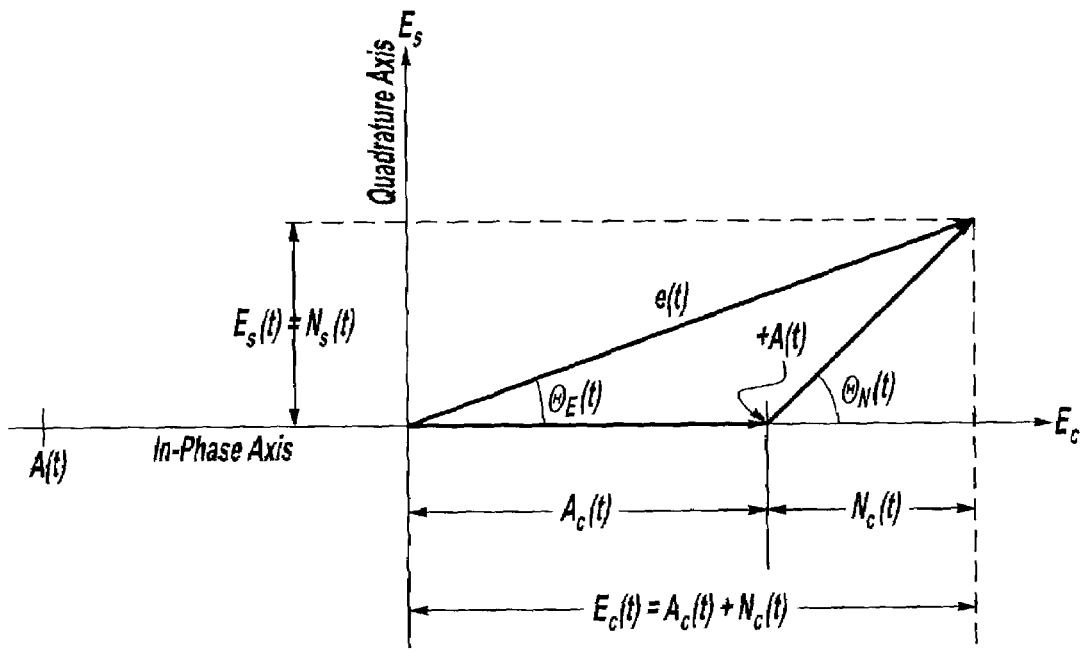
FIG. 2 is a vector diagram showing the relationship of the various signal and noise quadrature components of the input of the BPSK demodulator of FIG. 1, according to the prior art.

FIG. 2 illustrates, geometrically, the relationship of the various signal and noise quadrature components of the input of the BPSK demodulator in the case of the bi-phase signal $s_1(t)=A_c(t)=A(t)\cos(\theta_1(t))=+A(t)$. In this figure, it is easily seen how the addition of the noise n(t) to the signal $s_1(t)$ yields a total composite signal e(t) with a phase of $\theta_E(t)$ with respect to the in-phase axis. The phase $\theta_E(t)$ becomes, in this bi-phase signaling case, the phase error of the received signal $s_1(t)$, which represents the input to the demodulator.

Given the preceding development of the relationships of the various signal components that enter into the demodulation of a BPSK signal, the problem which is being addressed by the present invention is the determination of the associated signal-to-noise ratio $$\gamma(t) = \frac{A^2(t)}{\sigma_N^2(t)}$$

where the noise variance $\sigma_N^2$ is given by $$\sigma_N^2(t) = \frac{\langle N_c^2 \rangle}{2} + \frac{\langle N_s^2 \rangle}{2}$$

As described hereinbelow, this problem can be placed on a mathematically tractable basis and its correct solution rests on the statistical connection between the easily measurable parameters, not of the demodulator output, but rather of the demodulator input, i.e., E(t) and/or $\theta_N(t)$, and the signal-to-noise ratio $\gamma$. The fact that the demodulator input is significant is that it contains both the in-phase and quadrature components of the noise. Additionally, the bi-phase nature of the signal modulation, i.e., $\pm A(t)$, is a major impediment in the application of the prior art methods mentioned above. According to the invention, this aspect of the signal must be properly accounted for in a legitimate treatment of the problem. It is therefore useful to examine (next section) what is known about the statistics of the noise process.

Noise Statistics and the Signal-To-Noise Ratio

The noise components $N_c(t)$ and $N_s(t)$ are random quantities whose statistics are usually considered to be governed by a Gaussian random process. Additionally, it is known that such quadrature components are statistically independent. Letting $\sigma_N^2(t)$ be the variance of each of these noise components, one has for their joint probability density $$p(N_c(t), N_s(t)) = \left(\frac{1}{2\pi\sigma_N^2(t)}\right)\exp\left[-\frac{N_c^2(t) + N_s^2(t)}{2\sigma_N^2(t)}\right] \quad (Eq.16)$$

Using equations (Eq.10), (Eq.11), (Eq.14) and (Eq.15), one has in terms of the composite signal parameters E(t) and $\theta_E(t)$, $$N_c(t) = E(t)\cos(\theta_E(t)) - A_c(t) \quad (Eq.17)$$

and $$N_s(t) = E(t)\sin(\theta_E(t)) \quad (Eq.18)$$

Transforming the probability density function of $N_c$ and $N_s$ (dropping the time dependence for notational clarity) given by equation (Eq.16) into one that is a function of E and $\theta_E(t)$ involves the transformation $$p(E, \theta_E) = p(N_c, N_s)\left|\frac{\partial(N_c, N_s)}{\partial(E, \theta_E)}\right| \quad (Eq.19)$$

which requires the Jacobian $$\left|\frac{\partial(N_c, N_s)}{\partial(E, \theta_E)}\right| \equiv \begin{vmatrix} \frac{\partial N_c}{\partial E} & \frac{\partial N_c}{\partial \theta_E} \\ \frac{\partial N_s}{\partial E} & \frac{\partial N_s}{\partial \theta_E} \end{vmatrix} = E \quad (Eq.20)$$

where equations (Eq.17) and (Eq.18) are used to obtain the indicated result. Thus, using equations (Eq.16)–(Eq.20), one has in terms of the composite signal parameters $$p(E, \theta_E) = \left(\frac{E}{2\pi\sigma_N^2}\right)\exp\left[-\frac{(E\cos\theta_E - A_c)^2 + E^2\sin^2\theta_E}{2\sigma_N^2}\right] \quad (Eq.21)$$

$$= \left(\frac{E}{2\pi\sigma_N^2}\right)\exp\left(-\frac{A_c^2}{2\sigma_N^2}\right)\exp\left[-\frac{E^2 - 2A_cE\cos\theta_E}{2\sigma_N^2}\right]$$

The signal-to-noise ratio $\gamma$ characterizing the composite signal input to the demodulator is given for the BPSK case as $\gamma(t) = A(t)/\sigma_N^2(t)$. Writing equation (Eq.21) in terms of $\gamma$ and remembering equation (Eq.3) gives $$p(E, \theta_E \mid \gamma, \theta_i, \sigma_N) = \quad (Eq.12)$$
$$\left(\frac{E}{2\pi\sigma_N^2}\right)\exp\left(-\frac{\gamma}{2}\cos^2\theta_i\right)\cdot\exp\left[\frac{E^2 - 2E\sigma_N\sqrt{\gamma}\cos\theta_i\cos\theta_E}{2\sigma_N^2}\right]$$

where the density function $p(E, \theta_E)$ is now written as a conditional probability density $p(E, \theta_E \mid \gamma, \theta_i, \sigma_N)$ governing the values of E and $\theta_E$ conditioned on the values of $\gamma$, $\theta_i$, and $\sigma_N$. This is done with the hope of being able to obtain an expression, using equation (Eq.22), connecting the measurable values of E and/or $\theta_E$ at the output of the demodulator only to the associated value for $\gamma$, thus allowing one to statistically estimate $\gamma$ from such easily measured values.

Having secured the above relationship governing the probability density of the envelope and phase of the composite signal, i.e., E and $\theta_E$, and the prevailing values of the signal-to-noise ratio $\gamma$, the variance of the noise power $\sigma_N^2$, and the phase state of the transmitted signal $\theta_i$, one can obtain two relationships involving measurable statistics of E, or $\theta_E$, and $\gamma$. For example, one can obtain the statistics, conditioned on the value for $\gamma$, that describe the composite signal envelope over all possible signal phase states simply by summing equation (Eq.22) over the two possible values for $\theta_i(t)$ and integrating over all possible values of the phase $\theta_E$, using the following integral taken from I. S. Gradshteyn and I. M. Ryzhik, *Table of Integrals, Series, and Products* (Academic Press, New York, 1980). Eq.(3.534.2) ("Gradshteyn"):

$$\int_{-\pi}^{\pi}\sum_{i=1}^{2} p(E, \theta_E \mid \gamma, \theta_i, \sigma_N)d\theta_E = \left(\frac{E}{2\pi\sigma_N^2}\right)\exp\left(-\frac{\gamma}{2}\right)\exp\left(-\frac{E^2}{2\sigma_N^2}\right)\cdot \quad (Eq.23)$$

$$\int_{-\pi}^{\pi}\left\{\exp\left[+\frac{\sqrt{\gamma}E}{\sigma_N}\cos\theta_E\right] + \exp\left[-\frac{\sqrt{\gamma}E}{\sigma_N}\cos\theta_E\right]\right\}d\theta_E =$$

$$\left(\frac{E}{\pi\sigma_N^2}\right)\exp\left(-\frac{\gamma}{2}\right)\exp\left(-\frac{E^2}{2\sigma_N^2}\right)\int_0^{\pi} 2\cosh\left(\frac{\sqrt{\gamma}E}{\sigma_N}\cos\theta_E\right)d\theta_E =$$

$$\left(\frac{2E}{\sigma_N^2}\right)\exp\left(-\frac{\gamma}{2}\right)\exp\left(-\frac{E^2}{2\sigma_N^2}\right)I_0\left(\frac{\sqrt{\gamma}E}{\sigma_N}\right) = p(E \mid \gamma, \sigma_N)$$

which is a form of the well-known generalized Rayleigh distribution for the bi-phase signal envelope. Although this expression is useful for many purposes, it is not sufficient for the estimation of the quantity $\gamma$ from measurable statistics involving E(t) since, as can be seen from equation (Eq.23), it explicitly involves the parameter $\sigma_N^2$. Thus, using such an approach, one must know, a priori, the prevailing values of $\sigma_N^2$. Further consideration shows that this must be the case since the noise n(t) has two degrees of freedom which contributes to the composite signal envelope, i.e., N(t) and $\theta_N(t)$, as seen from FIG. 2. Integrating over all possible values of the phase characterizing the demodulator output leaves the phase of the noise to be determined by knowledge of $\sigma_N$. Thus, if one desires to obtain an estimate of $\gamma$ from measurements of E or some statistic related to E, using the technique described above, one would also need an a priori estimate of $\sigma_N$, thus rendering useless a straightforward estimate of γ from easily measurable signal parameters. (In contrast thereto, it is the express object of the present invention to obtain an estimate of γ from such easily measurable signal parameters.)

However, if one considers statistics that describe the composite signal phase error $\theta_E(t)$ by summing equation Eq.(22) over the two possible values for $\theta_i(t)$ and integrating over all possible values of the signal envelope E(t), one obtains (e.g., using Gradshteyn, Eq.(3.562.4))

$$\int_0^\infty \sum_{i=1}^2 p(E, \theta_E \mid \gamma, \theta_i, \sigma_N) dE = \quad \text{(Eq.24)}$$

$$\left(\frac{1}{2\pi\sigma_N^2}\right) \exp\left(-\frac{\gamma}{2}\right) \cdot \int_0^\infty E \exp\left(-\frac{E^2}{2\sigma_N^2}\right)$$

$$\left\{\exp\left[+\frac{\sqrt{\gamma}E}{\sigma_N}\cos\theta_E\right] + \exp\left[\frac{\sqrt{\gamma}E}{\sigma_N}\cos\theta_E\right]\right\} dE =$$

$$\left(\frac{1}{\pi\sigma_N^2}\right)\exp\left(-\frac{\gamma}{2}\right)\int_0^\infty E\exp\left(-\frac{E^2}{2\sigma_N^2}\right)\cosh\left(\frac{\sqrt{\gamma}E}{\sigma_N}\cos\theta_E\right)dE =$$

$$\left(\frac{1}{\pi}\right)\exp\left(-\frac{\gamma}{2}\right)\int_0^\infty r\exp\left(-\frac{r^2}{2}\right)\cosh(\sqrt{\gamma}\,r\cos\theta_E)\,dr =$$

$$\sqrt{\frac{1}{2\pi}}\sqrt{\gamma}\cos(\theta_E)\exp\left(-\frac{\gamma}{2}\sin^2\theta_E\right)\mathrm{erf}\left(\sqrt{\frac{\gamma}{2}}\cos\theta_E\right)+$$

$$\frac{1}{\pi}\exp\left(-\frac{\gamma}{2}\right) = p(\theta_E \mid \gamma)$$

where the third integral results from the change of variables $r = E/\sigma_N$ and erf( ... ) in the fourth line is the 'error function' or probability integral defined by $$\mathrm{erf}(x) \equiv \frac{2}{\sqrt{\pi}}\int_0^x \exp(-t^2)dt$$

This formulation does not involve any a priori information other than the signal-to-noise ratio γ. Thus, equation (Eq.24) gives a relationship involving the conditional probability density of the phase of the demodulator output given a value for the signal-to-noise ratio γ of the composite signal, with no other a priori information necessary. This expression is indeed a candidate for the basis of estimating γ from knowledge of values for $\theta_E$. The proper mathematical foundation for this procedure will now be given.

The Maximum Likelihood Estimation of Signal-to-Noise Ratio from Phase Measurements of the BPSK Demodulator Input Equation (Eq.24), giving the conditional probability density governing the values of $\theta_E$ given a prevailing value for γ, can formally be written in the opposite sense, i.e., a conditional probability density governing the values of γ given a prevailing value for $\theta_E$, viz., $$p(\gamma \mid \theta_E) = \quad \text{(Eq.25)}$$

$$\sqrt{\frac{1}{2\pi}}\sqrt{\gamma}\cos(\theta_E)\exp\left(-\frac{\gamma}{2}\sin^2\theta_E\right)\mathrm{erf}\left(\sqrt{\frac{\gamma}{2}}\cos\theta_E\right) + \frac{1}{\pi}\exp\left(-\frac{\gamma}{2}\right)$$

Although not explicitly shown in equation (Eq.25) for notational simplicity, all signal components that enter into this expression are still functions of time, $\theta_E = \theta_E(t)$, etc. Assuming that a time series of statistically independent phase measurements $\theta_E(t_1), \theta_E(t_2), \ldots, \theta_E(t_k)$ can be obtained from the composite signal input to the demodulator that subtend a time interval $\Delta t = t_k - t_1$ whose value is small enough such that γ(t) and σ(t) can be taken to be constant in Δt, one can use equation (Eq.25) to obtain a probability density function conditioned on the series of phase measurements given by $$p(\gamma \mid \theta_E(t_1), \theta_E(t_2), \cdots, \theta_E(t_k)) \equiv \prod_{j=1}^k p(\gamma \mid \theta_E(t_j)) \quad \text{(Eq.26)}$$

From this, one can form the likelihood functional defined by $$L(\gamma \mid \theta_E(t_1), \theta_E(t_2), \cdots, \theta_E(t_k)) \equiv \quad \text{(Eq.27)}$$

$$\ln\{p(\gamma \mid \theta_E(t_1), \theta_E(t_2), \cdots, \theta_E(t_k))\} = \sum_{j=1}^k \ln\{p(\gamma \mid \theta_E(t_j))\}$$

According to the method of maximum likelihood, the corresponding estimate γ* of γ is found from this functional as that value of γ for which L( ... ) is a maximum. Hence, the estimate γ* of γ which prevails over the set of phase measurements $\theta_E(t_1), \sigma_E(t_2), \ldots, \theta_E(t_k)$, of a BPSK modulated signal is given by $$\left.\frac{\partial L(\gamma \mid \theta_E(t_1), \theta_E(t_2), \cdots, \theta_E(t_k))}{\partial \gamma}\right|_{\gamma=\gamma^*} = 0 \quad \text{(Eq.28)}$$

It is important to remember that the bipolar nature of the modulated signal as well as the usual assumptions of Gaussian noise are already convolved in the probabilistic description of equation (Eq.25). Also, unlike the general case where γ and $\sigma_N^2$ are functions of time, they can now be taken as constant and independent of time during sufficiently small measurement intervals Δt. A quantitative measure for 'sufficiently small' will be given below.

It is now necessary to find the root γ* of equation (Eq.28). Using equations (Eq.25)–(Eq.27) in equation (Eq.28), and, for analytical tractability, neglecting the last term of equation (Eq.25) (an approximation which holds for large values of γ), and performing the required differentiation yields $$\left.\frac{\partial L}{\partial \gamma}\right|_{\gamma=\gamma^*} = 0 = \frac{k}{2}\left(\frac{1}{\gamma^*}\right) - \frac{1}{2}\sum_{i=1}^k \sin^2(\theta_E(t_i)) + + \quad \text{(Eq.29)}$$

$$\sum_{i=1}^k \frac{\partial}{\partial\gamma}\left\{\ln\left(\mathrm{erf}\left(\sqrt{\frac{\gamma}{2}}\cos(\theta_E(t_i))\right)\right)\right\}\Bigg|_{\gamma=\gamma^*}$$

Completing the differentiation of the last term results in a rather unwieldy expression. Using the fact that the erf( ... ) function tends to a constant for large values of the argument, i.e., for large γ, one can neglect this term (consistent with the neglect of the second term of equation (Eq.25)) and find that in this case, the optimal estimate for γ of a bi-phase signal with additive Gaussian noise based on a series of k phase measurements $\theta_E(t_i)$ of the composite signal input is given by $$\gamma^* = \left[\frac{1}{k}\sum_{i=1}^{k}\sin^2(\theta_E(t_i))\right]^{-1}, \gamma \gg 1 \qquad (\text{Eq.30})$$

Because of the approximations involved with neglecting the second term of equation (Eq.25) and the third term of equation (Eq.29), this maximum likelihood estimate is biased toward large values of $\gamma$. This bias must now be removed for small values of $\gamma$. To this end, one uses the original expression of equation (Eq.25) retaining the second term since this will be appreciable for small $\gamma$. However, to maintain analytical flexibility, the erf ( . . . ) function of equation (Eq.25) will continued to be neglected. Finally, the analysis becomes more amenable if the inverse function $1/\gamma^*$ given by equation (Eq.30) is used. Given these considerations, one has (using Gradshteyn Eq.(3.381.1) and use of the simplifying transformations embodied in Eqs.(8.356.1) and (8.359.4)) for the unbiased estimate $\hat{\gamma}$ of $\gamma^*$ over all possible values of the phase $\theta_E(t)$ $$\left\langle\frac{1}{\gamma^*}\right\rangle = \int_{-\frac{\pi}{2}}^{\frac{\pi}{2}}\sin^2(\theta_E)p(\hat{\gamma}|\theta_E)d\theta_E = \qquad (\text{Eq.31})$$

$$\left(\frac{2}{\pi}\right)\exp\left(-\frac{\hat{\gamma}}{2}\right)\int_0^{\frac{\pi}{2}}\sin^2\theta_E\, d\theta_E ++$$

$$2\sqrt{\frac{1}{2\pi}}\sqrt{\hat{\gamma}}\int_0^{\frac{\pi}{2}}\sin^2(\theta_E)\cos(\theta_E)\exp\left(-\frac{\hat{\gamma}}{2}\sin^2(\theta_E)\right)d\theta_E =$$

$$\left(\frac{1}{2} - \sqrt{\frac{2}{\pi}}\sqrt{\frac{1}{\hat{\gamma}}}\right)\exp\left(-\frac{\hat{\gamma}}{2}\right) + \left(\frac{1}{\hat{\gamma}}\right)erf\left(\sqrt{\frac{\hat{\gamma}}{2}}\right)$$

Figure 3:
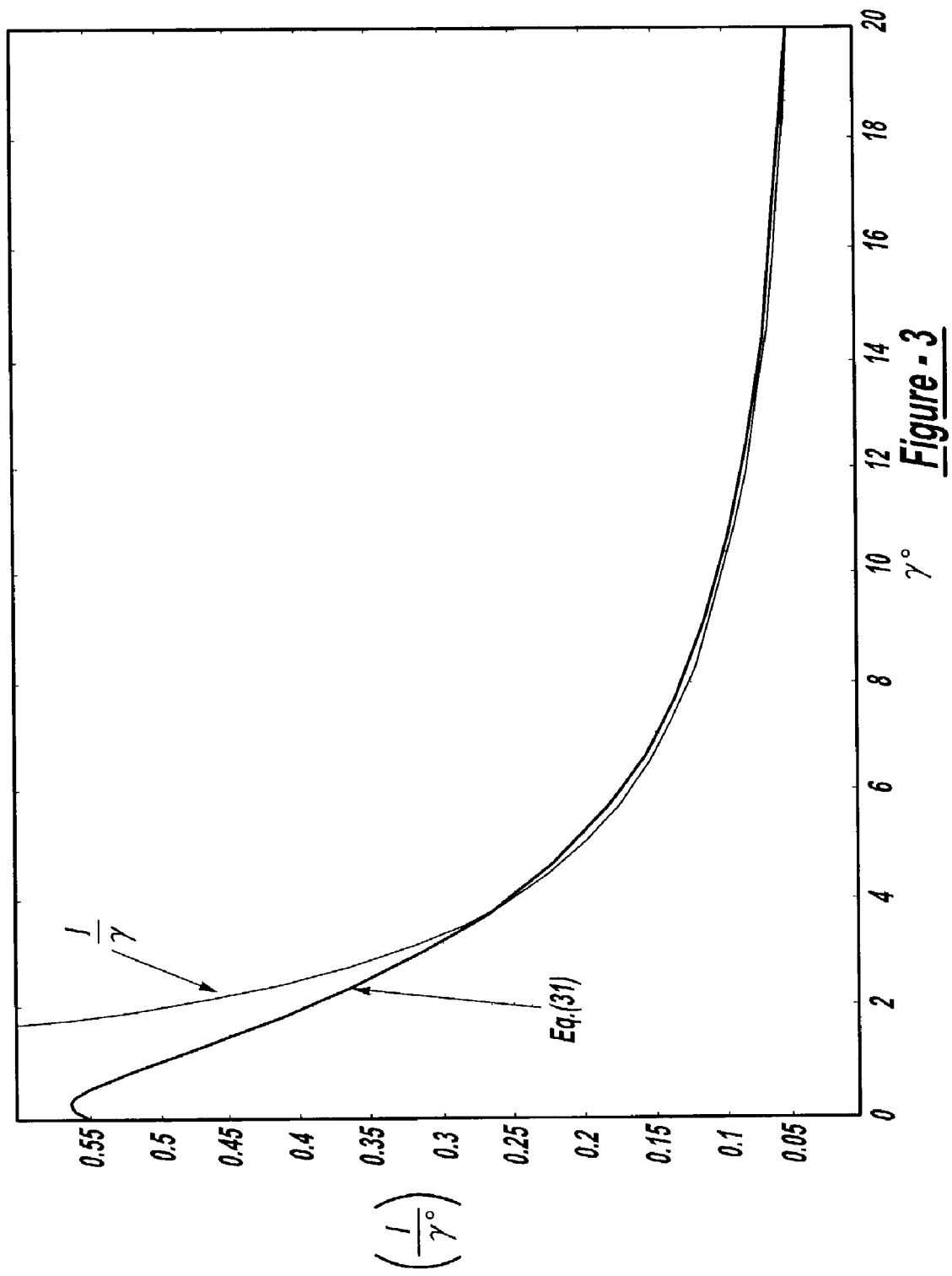
FIG. 3 is a characteristic curve relating the biased estimate γ*, calculated from phase error measurements $\theta_E(t_i)$ according to equation (Eq.30), to the unbiased estimate $\hat{\gamma}$, according to the invention.

Thus, the unbiased estimate $\hat{\gamma}$ of $\gamma$ is related to the biased estimate $\gamma^*$, given by equation (Eq.30), through the nonlinear relationship of equation (Eq.31). (It should be mentioned that the ensemble average of $\sin^2(\theta_E)$ is calculated over the phase interval $-\pi/2 \leq \theta_E \leq \pi/2$ since $p(\hat{\gamma}|\theta_E)$ is periodic in $\theta_E$ with period $\pi$. (Hence, phase values that differ by $\pm\pi$ essentially correspond to the same SNR values and the averaging interval chosen in equation (Eq.31) implements the separate identification of these intervals.) Since there are no other parameters of the problem that enter into equation (Eq.31), this relationship is universal for BPSK modulation and is plotted in FIG. 3. FIG. 3 is a characteristic curve relating the biased estimate $\gamma^*$, calculated from phase error measurements $\theta_E(t_i)$ according to equation Eq.(30), to the unbiased estimate $\hat{\gamma}$. From equation (Eq.31) one has the following limiting behavior:

$$\lim_{\hat{\gamma}\to 0}\left\langle\frac{1}{\gamma^*}\right\rangle = \frac{1}{2}, \quad \lim_{\hat{\gamma}\to\infty}\left\langle\frac{1}{\gamma^*}\right\rangle = \frac{1}{\hat{\gamma}}$$

Thus, for large $\hat{\gamma}$, the two estimates converge for the reasons explained above. In the case of small $\hat{\gamma}$, the biased estimate approaches 2 since in this case, the phase errors $\theta_E(t_i)$ are randomly distributed within their range $-\pi/2 \leq \theta_E(t_i) \leq \pi/2$. Note that equation (Eq.31) does not monotonically approach the value of 0.5 as $\gamma \to 0$; it overshoots the 0.55 level before it turns toward the 0.5 limit. This "defect" is due to the approximation made above in the neglect of the erf( . . . ) function in equation (Eq.29), and can be corrected if desired, based on the teachings set forth herein and additional analysis.

The implementation of this process is straightforward. Considering now the composite signal input to the demodulator in terms of equations (Eq.9) and (Eq.14)–(Eq.15), instead of the previous representation of equation (Eq.8), and keeping in mind the goal of securing the values of the phase error $\theta_E(t)$, one arrives at the modifications shown in FIG. 4, which illustrates exemplary modifications (additions) to the BPSK demodulator of FIG. 1 to obtain phase error in composite signal.

Figure 4:
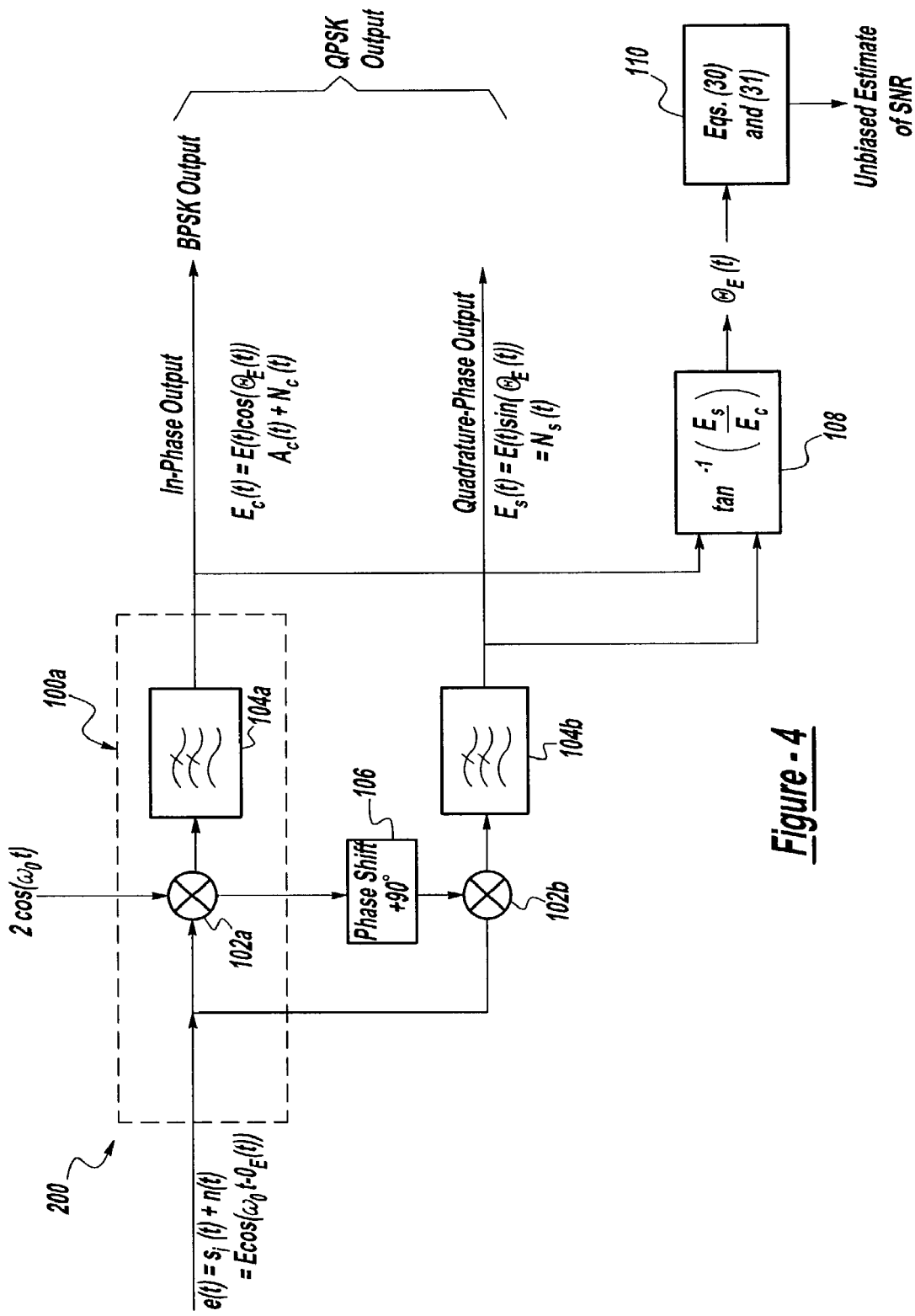
FIG. 4 is a simplified block diagram of an embodiment of a BPSK demodulator implementing the techniques of the present invention.

FIG. 4 illustrates an embodiment of a the present invention, implementing the techniques described hereinabove. The overall demodulator 200 includes two iterations 100a and 100b of the demodulator 100 described with respect to FIG. 1. The one demodulator 100a has a mixer 102a with two inputs, receiving the composite signal e(t) and the stable carrier signal 2 cos($\omega_0$t) and outputting a signal, through a low pass (bandpass) filter 104a, which is the demodulated the in-phase output $A_c(t)+N_c(t)$.

The second demodulator 100b also comprises a mixer 102b and a low pass filter 104b. The mixer (e.g., multiplier) 102b has two inputs: an input receiving (e.g., from the receiver block, not shown) the same composite signal e(t) which is input to the mixer 102a, and an input receiving a phase-shifted version of the stable carrier signal 2 cos($\omega_0$t) which is input (not phase-shifted) to the other mixer 102a. The phase shift is effected by a functional block 106 which, in the case of BPSK, shifts the phase by 90 degrees. Other angles can be selected for other phase modulation schemes.

The output of the mixer 102b contains sum and difference components of the composite input signal and the carrier signal. To reject (suppress, eliminate) the sum component, and preserve the difference component, the output of the mixer 102b is passed through a low pass filter 104b, the output of which is phase-shifted with respect to the output of the low pass filter 104a.

In this example, the output (In-Phase Output) of the low pass filter 104a is $$E_c(t)=E(t)\cos(\theta_E(t))=A_c(t)+N_c(t). \qquad (\text{Eqs.10, 14})$$

and the output (Quadrature-Phase Output) of the low pass filter 104b is $$E_s(t)=E(t)\sin(\theta_E(t))=N_s(t). \qquad (\text{Eqs.11, 15})$$

According to the invention, for purposes of estimating SNR of a BPSK signal, a QPSK demodulator structure is "evolved" from the original BPSK demodulator structure (of FIG. 1). In this manner, the quantities needed to obtain the phase error inherent in the demodulated signal can be captures. Thus it can be seen that one must form a QPSK demodulator from a BPSK demodulator so that, in addition to the In-Phase output of the BPSK demodulator, one now also has the associated quadrature-phase output.

These two outputs of the low pass filters 104a and 104b are supplied to a functional block 108 which takes (calculates) the arctangent (or alternatively the arc-cotangent) of the two signals (Es which is sine-based, and Ec which is cosine-based), the output of which is the phase error (noise) $\theta_E(t)$ contained within the composite input signal e(t), for sampling. This output of the functional block 108 is provided to a functional block 110 which performs the calculations set forth in equations (Eq.30) and (Eq.31).

As k sampled values of $\theta_E(t)$ are obtained (how to determine a value for k is discussed below), one then implements equation (Eq.30) to obtain the biased estimate $\gamma^*$ of the signal-to-noise ratio $\gamma$. Once this has been obtained, equation (Eq.31) is employed and solved for the corresponding unbiased estimate $\hat\gamma$; this latter procedure can be effected by use of a 'look-up' table that represents the universal graphical behavior of FIG. 3.

The functional blocks 108 and 110 are preferably implemented in software, and the mixers (102a, 102b), low pass filters (104a, 104b) and phase-shifter (106) are preferably implemented in hardware.

Determination of Phase Sampling Length to Assure Constancy of $\gamma$ and $\sigma_N^2$ During the Interval As mentioned above, $\gamma$ and $\sigma_N^2$ can be taken as constant and independent of time during sufficiently small measurement intervals $\Delta t$. It is imperative that the prevailing values for $\gamma$ and $\sigma_N^2$ not evolve during the time period in which the k samples of composite signal phase $\theta_E(t_i)$ are formed to obtain the biased estimate $\gamma^*$. The fundamental constraint which must be addressed during the measurement process is the fact that $\gamma$ does not have spectral components that exceed 20 Hz for an atmospheric channel. (This is typically the upper limit for atmospheric scintillation at communications satellite frequencies.) Thus, if the data rate of the communications link is $R_D$ bps, and if a measurement of the phase $\theta_E(t_i)$ occurs for k consecutive bit intervals, one must satisfy the Nyquist sampling constraint $$\frac{R_D}{k} \geq 40 \text{Hz}$$

This inequality serves to bound the number of phase samples. (Thus, the measurement interval $\Delta t$ should preferably be less than $\frac{1}{40}$ second.)

It will be appreciated by those with ordinary skill in the art that the methods of the present invention may be readily implemented using a computer processor and associated software. Thus, the circuitry of FIG. 4 may be integrated with a microprocessor associated with the respective receiver and having software to perform the above-described calculations. An application specific integrated circuit (ASIC) or chip set may also be constructed to perform the inventive methods, or a digital signal processor (DSP) may be designed to perform these methods. All of these embodiments and equivalents thereof are intended to be within the scope of the invention.

As described hereinabove with respect to FIG. 4, a BPSK demod may be modified into a QPSK one so as to provide the quandature-phase output, from which both outputs are operated upon to obtain the phase error and finally, the unbiased estimate of the SNR. Based on the teachings set forth herein, one of ordinary skill in the art to which the present invention most nearly pertains may apply the technique higher order phase modulated states. However, it is first important to note that the methods described hereinabove apply only to a single class (albeit, a popular one, BPSK) of digital phase modulation schemes in which the digital information is encoded among M-possible evenly displaced phase shifts, each separated by 2*PI/M radians (see, e.g., equation (Eq.1)). For cases other than that of the BPSK case, one must go back into the theory and re-apply the analysis for the QPSK case, i.e., the four phase state case which requires equation (Eq.24) of the manuscript to be evaluated over four (i=1, 2, 3, 4) phase states. This will result in a different functional form of the final expressions of equations (Eq.30) and (Eq.31). The same methodology would be applied to higher order (i.e., M>4) phase shifts. Thus, in all cases, the overall technique of the present invention and its morphology remain the same, but its application and form for each modulation scenario will be functionally (i.e., mathematically) different.

Although the invention has been described in connection with various specific embodiments, those skilled in the art will appreciate that numerous adaptations and modifications may be made thereto without departing from the spirit and scope of the invention as set forth in the claims.

For example, the simplest application of the techniques described hereinabove to QPSK and other M-ary phase modulated cases would involve using the method shown in FIG. 4 in conjunction with equation (Eq.30) with just one of the arms of the demodulator. In the interest of maintaining mathematical rigor, one could return to the analysis given above and employ, e.g., M=4 in equation (Eq.1) for the QPSK case. Thus, equation (Eq.24) would then employ a sum over i=4 possible phase states. It should be understood, however, that this would complicate the SNR estimate analogous to that of equation (Eq.30) for the BPSK case.

Also, the invention is extendable to multi-level modulation techniques that include amplitude as well as phase modulation such as 16QAM (Quadrature Amplitude Modulation) which is a 4-level modulation technique transmitting four bits per symbol.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein

What is claimed is:

1. Method of estimating signal-to-noise ratio (SNR) $\gamma$ of a composite input signal e(t) on a communications link, comprising:

providing a first demodulator receiving the composite input signal and a stable carrier signal, and outputting an in-phase output signal;

providing a second demodulator receiving the composite input signal and a phase-shifted version of the stable carrier signal, and outputting a quadrature-phase output signal;

calculating phase error $\theta_E(t)$) contained within the composite input signal e(t) from the outputs of the first and second demodulators;

estimating a biased estimate $\gamma^*$ for the signal-to-noise ratio (SNR) $\gamma$ of the composite input signal using maximum likelihood (ML) estimation techniques; and estimating an unbiased estimate $\hat\gamma$ for the signal-to-noise ratio (SNR) $\gamma$ of the composite input signal from the biased estimate $\gamma^*$;

taking a series of $\kappa$ phase measurements $\theta_E(t_i)$ of the composite signal input where $\kappa$ is a number of sampled values; and calculating a biased estimate $\gamma^*$ for the signal-to-noise ratio (SNR) $\gamma$ of the composite input signal, over all possible values of the phase error $\theta_E(t)$, according to the following equation:

$$\gamma^* = \left[\frac{1}{k}\sum_{i=1}^{k}\sin^2(\theta_E(t_i))\right]^{-1},$$

$\gamma \gg 1$; and calculating an unbiased estimate $\hat{\gamma}$ from the biased estimate $\gamma^*$, according to the following equation:

$$\left\langle\frac{1}{\gamma^*}\right\rangle = \int_{-\frac{\pi}{2}}^{\frac{\pi}{2}}\sin^2(\theta_E)p(\hat{\gamma}|\theta_E)d\theta_E =$$

$$\left(\frac{2}{\pi}\right)\exp\left(-\frac{\hat{\gamma}}{2}\right)\int_0^{\frac{\pi}{2}}\sin^2\theta_E\,d\theta_E +$$

$$+2\sqrt{\frac{1}{2\pi}}\sqrt{\hat{\gamma}}\int_0^{\frac{\pi}{2}}\sin^2(\theta_E)\cos(\theta_E)\exp\left(-\frac{\hat{\gamma}}{2}\sin^2(\theta_E)\right)d\theta_E =$$

$$\left(\frac{1}{2}-\sqrt{\frac{2}{\pi}}\sqrt{\frac{1}{\hat{\gamma}}}\right)\exp\left(-\frac{\hat{\gamma}}{2}\right)+\left(\frac{1}{\hat{\gamma}}\right)erf\left(\sqrt{\frac{\hat{\gamma}}{2}}\right).$$

2. A method, according to claim 1, wherein the carrier signal, as received by the second demodulator, is phase-shifted by 90 degrees with respect to the carrier signal received by the first modulator.

3. A method, according to claim 1, wherein;
the phase error $\theta_E(t)$) contained within the composite input signal e(t) is calculated by taking the arctangent ($\tan^{-1}$) of the outputs of the two demodulators.

4. A method, according to claim 1, wherein the composite input signal is a bi-phase signal with additive Gaussian noise.

5. A method, according to claim 1, further comprising:
obtaining a time series of statistically independent phase error measurements $\theta_E(t_i)$, $\theta_E(t_2)$, . . . , $\theta_E(t_k)$ from the composite input signal that subtend a time interval $\Delta t = t_k - t_i$ whose value is small enough such that $\gamma(t)$ and $\sigma(t)$ can be taken to be constant in $\Delta t$.

6. A method, according to claim 1, wherein the unbiased estimate $\hat{\gamma}$ is determined from the biased estimate $\gamma^*$ by use of a look-up table.

7. Method, according to claim 1, further comprising:
determining an unbiased estimate $\hat{\gamma}$ from the biased estimate $\gamma^*$ by use of a look-up table.

8. Method according to claim 1, wherein:
the ensemble average of $\sin^2(\theta_E)$ is calculated over the phase interval $-\pi/2 \leq \theta_E \leq \pi/2$.

9. Method, according to claim 8, wherein the communications link has a data rate $R_D$ bps, and further comprising:
measuring the phase $\theta_E(t_i)$ occurs for k consecutive bit intervals, and
ensuring that following limitation is met:

$$\frac{R_D}{k} \geq 40\text{Hz}.$$

10. A method, according to claim 8, further comprising obtaining a time series of statistically independent phase measurements $\theta_E(t_1)$, $\theta_E(t_2)$, . . . , $\theta_E(t_k)$ from the composite input signal that subtend a time interval $\Delta t = t_k - t_1$ whose value is small enough such that $\gamma(t)$ and $\sigma(t)$ can be taken to be constant in $\Delta t$.

11. A method, according to claim 1, wherein the communications link is selected from the group consisting of BPSK, QPSK and other M-ary phase modifications.

12. A method, according to claim 1, wherein the communications link is selected from the group consisting of terrestrial and space communication, cellular and hand-held telephones, planetary communications; and optical communications.

* * * * *